United States Patent
Maeda et al.

(10) Patent No.: US 8,194,702 B2
(45) Date of Patent: Jun. 5, 2012

(54) TRANSMISSION APPARATUS AND TRANSMISSION METHOD

(75) Inventors: Noriyuki Maeda, Yokohama (JP); Hiromasa Fujii, Yokosuka (JP); Shunji Miura, Yokohama (JP); Hiromitsu Asakura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 745 days.

(21) Appl. No.: 11/944,562

(22) Filed: Nov. 23, 2007

(65) Prior Publication Data

US 2008/0130783 A1 Jun. 5, 2008

(30) Foreign Application Priority Data

Nov. 24, 2006 (JP) .................. 2006-317486

(51) Int. Cl.
*H04J 3/24* (2006.01)
(52) U.S. Cl. ........ 370/476; 370/320; 370/355; 370/532; 370/539; 375/295
(58) Field of Classification Search .................. None
See application file for complete search history.

(56) References Cited

U.S. PATENT DOCUMENTS

| | | | | |
|---|---|---|---|---|
| 5,930,251 A * | 7/1999 | Murakami et al. | ....... | 370/395.65 |
| 6,058,122 A * | 5/2000 | Hwang et al. | ......... | 370/522 |
| 6,529,604 B1 * | 3/2003 | Park et al. | ......... | 381/22 |
| 7,436,857 B2 * | 10/2008 | Fong et al. | ......... | 370/498 |
| 7,545,731 B2 * | 6/2009 | Agin et al. | ......... | 370/204 |

FOREIGN PATENT DOCUMENTS

| | | |
|---|---|---|
| JP | 7-254915 | 10/1995 |
| JP | 2000-31944 | 1/2000 |
| JP | 2003-143601 | 5/2003 |
| WO | WO 2006/077621 A1 | 7/2006 |

OTHER PUBLICATIONS

Barmada B et al: "Prioritized Transmission of Data Partitioned H.264 Video With Hierarchical QAM" IEEE Signal Processing Letters, IEEE Service Center, Piscataway, NJ, US, vol. 12, No. 8, Aug. 2005, pp. 577-580, XP011136209 ISSN 1070-9908.*

B. Barmada, et al., "Prioritized Transmission of Data Partitioned H.264 Video With Hierarchical QAM", IEEE Signal Processing Letters, XP 011136209, vol. 12, No. 8, Aug. 2005, pp. 577-580.

B. Barmada, et al., "Adaptive Mapping and Priority Assignment for OFDM", 3G Mobile Communication Technologies, XP 002476171, May 8-10, 2002, Conference Publication No. 489, pp. 495-499.

* cited by examiner

*Primary Examiner* — Huy Vu
*Assistant Examiner* — Zewdu A Beyen
(74) *Attorney, Agent, or Firm* — Oblon, Spivak, McClelland, Maier & Neustadt, L.L.P.

(57) ABSTRACT

A transmission apparatus including: a layer multiplexing unit configured to assign, to a radio resource which is divided based on a time, a frequency and a layer, a bit sequence which constitutes at least one information source to be transmitted, in accordance with a communication state and a priority level of the information source; and a layer coding unit configured to perform a layer coding processing for the bit sequence assigned to the radio resource. The layer multiplexing unit performs the assignment so that a length of each bit sequence assigned to each radio resource becomes equivalent.

4 Claims, 6 Drawing Sheets

BACKGROUND ART FIG. 2
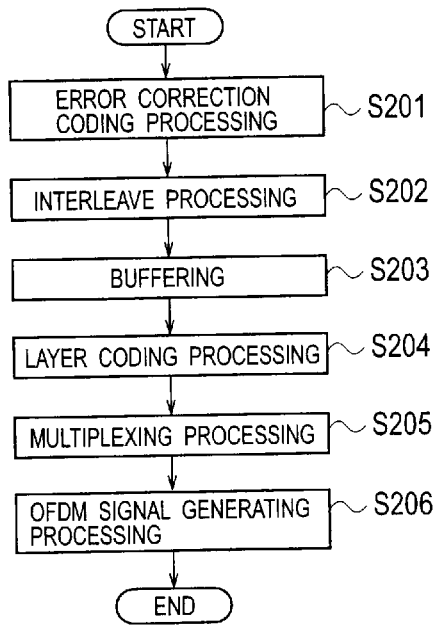
BACKGROUND ART FIG. 3
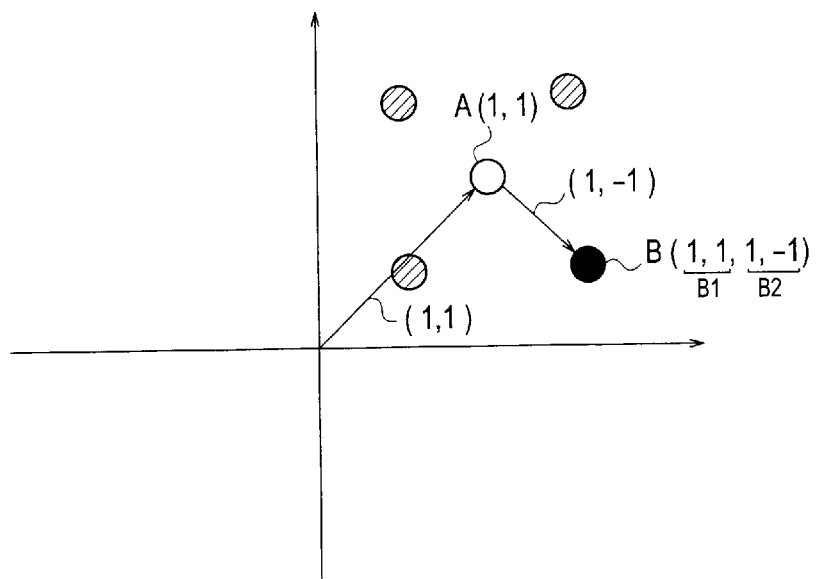

BACKGROUND ART FIG. 4
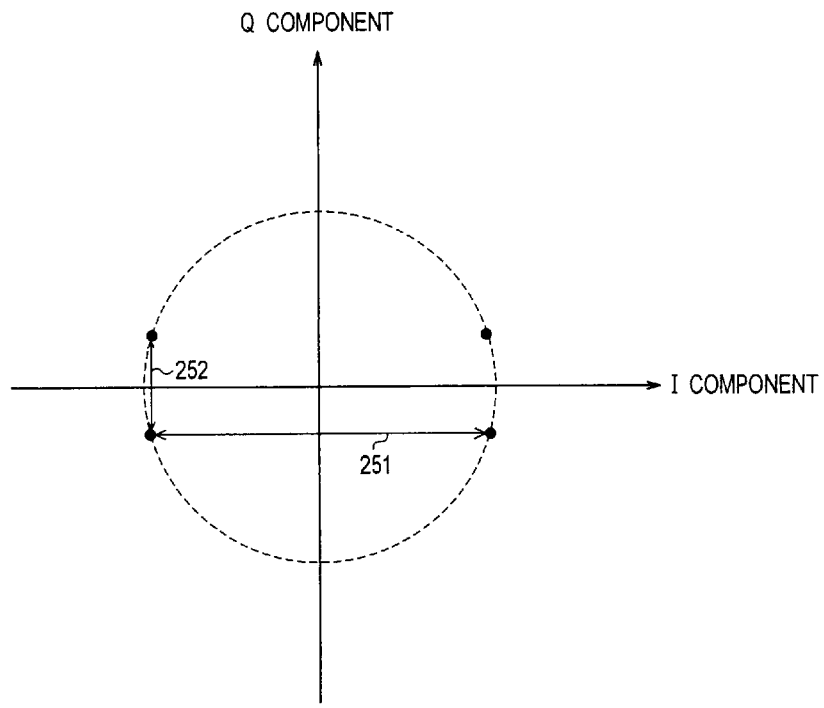
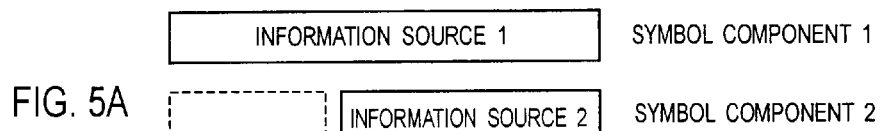
FIG. 5A
BACKGROUND ART
BACKGROUND ART
FIG. 5B
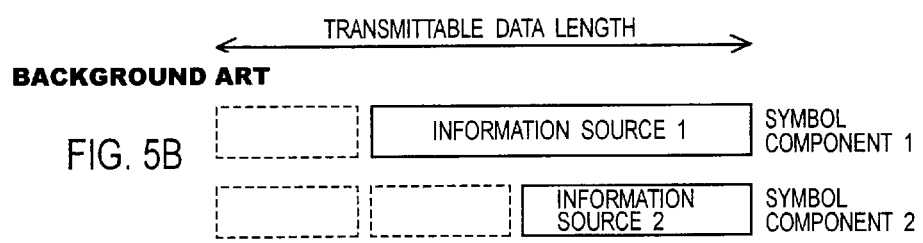

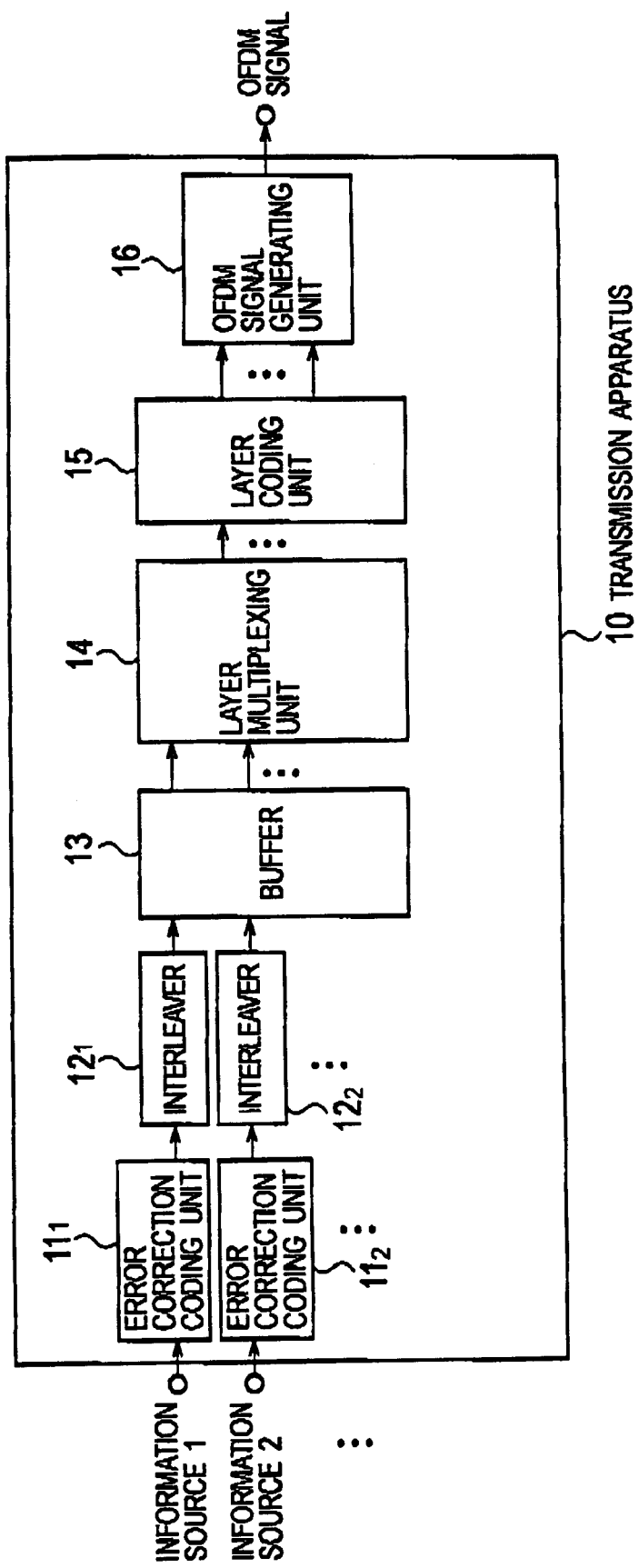

TRANSMISSION APPARATUS AND TRANSMISSION METHOD

CROSS REFERENCE TO RELATED APPLICATION

This application is based upon and claims the benefit of priority from the prior Japanese Patent Applications No. 2006-317486 filed on Nov. 24, 2006: the entire contents of which are incorporated herein by reference.

BACKGROUND OF THE INVENTION

1. Field of the Invention

The present invention relates to a transmission apparatus and a transmission method employing a layer coding method.

2. Description of the Related Art

Conventionally, a layer coding method has been known as a method for efficient and simultaneous transmission of information sources having different priorities.

The layer coding method is capable of improving transmission efficiency of an information source having a high priority even in an environment with a poor communication state, in the following way. In the layer coding method, a symbol component 1 is assigned a bit sequence which constitutes a high-priority information source, and a symbol component 2 is assigned a bit sequence which constitutes a low-priority information source. Here, the symbol component 1 is assumed to be received with a higher reception quality in a reception apparatus, while the symbol component 2 is assumed to be received with a lower reception quality in the reception apparatus.

With reference to FIGS. 1 to 4, an explanation will be given for a conventional transmission apparatus 20 employing the layer coding method.

The transmission apparatus 20 is configured by applying the layer coding method to the orthogonal frequency division multiplexing (OFDM) method that is one of multi-carrier transmission methods.

As shown in FIG. 1, the transmission apparatus 20 includes a plurality of error correction coding units $21_1$, $21_2$, . . . , a plurality of interleavers $22_1$, $22_2$, . . . , a buffer 23, a layer modulating unit provided with a layer coding unit 24, a multiplexing unit 25 and an OFDM signal generating unit 26.

With reference to FIG. 2, an explanation will be given for operations of the conventional transmission apparatus 20 employing the layer coding method As shown in FIG. 2, in step S201, each of the error correction coding units $21_1$, $21_2$, . . . , perform error correction coding processing for bit sequences constituting the inputted information sources 1, 2, . . . , respectively.

In step S202, each of the interleavers $22_1$, $22_2$, . . . , perform interleave processing for the bit sequences outputted from the error correction coding units $21_1$, $21_2$, . . . , respectively, after the error correction processing.

In step S203, the buffer 23 stores the bit sequences outputted from the interleavers $22_1$, $22_2$, . . . , respectively, after the interleave processing.

In step S204, the layer coding unit 24 performs layer coding processing for the bit sequences extracted from the buffer 23, according to a priority level of each of the information sources 1, 2, . . . , that constitute the bit sequences.

For example, as shown in FIG. 3, the layer coding unit 24 is configured to perform layer coding processing for a symbol component B1 (1, 1) is assigned a bit sequence which constitutes a high-priority information source 1, and where a symbol component B2 (1, −1) is assigned a bit sequence which constitutes a low-priority information source 2. Here, the symbol component B1 (1, 1) is assumed to be received with a higher reception quality in the reception apparatus and the symbol component B2 (1, −1) is assumed to be received with a lower reception quality in the reception apparatus.

Note that in the example shown in FIG. 3, the modulated signal having performed the layer coding processing is configured of any one of sixteen patterns of symbols with four bits indicated in one symbol.

Additionally, in the example shown in FIG. 3, the symbol component B1 indicates a coordinate point based on the origin point, and the symbol component B2 indicates a coordinate point based on the point A corresponding to the symbol component B1.

Here, in the example shown in FIG. 3, reception quality of the symbol component B1 in the reception apparatus is assumed to be better than reception quality of the symbol component B2 in the reception apparatus. This is because the symbol component B1 indicates only one coordinate point in one quadrant, while the symbol component B2 can potentially indicate four coordinate points in one quadrant.

Moreover, in Japanese Patent Publication No. 2000-31944, disclosed a technique as shown in FIG. 4 for improving transmission efficiency of a BPSK modulated signal, by enabling transmission of an information source 1 even in a poor communication state. Specifically, the transmission is enabled by performing the layer coding unit 24 to assign a bit sequence which constitutes a high-priority information source 1 to a symbol component 1 (I component), and to assign a bit sequence which constitutes a low-priority information source 2 to a symbol component 2 (Q component). Here, the symbol component 1 (I component) is assumed to be received with a higher reception quality in a reception apparatus, while the symbol component 2 (Q component) is assumed to be received with a lower reception quality in the reception apparatus.

Note that, in the example shown in FIG. 4, the modulated signal having performed the layer coding processing is configured of any one of four patterns of symbols with two bits indicated in one symbol.

Here, the reception quality of I component in the reception apparatus is assumed to be better than that of Q component, since the distance 251 between signal points of I component is longer than the distance 252 between signal points of Q component.

In step S205, the multiplexing unit 25 performs, multiplexing processing (scheduling processing) for the modulated signal having performed the layer coding processing, the modulated signal outputted from the layer coding unit 24. In the multiplexing processing, the multiplexing unit 25 assigns the modulated signal to a radio resource divided based on a time and a frequency (an orthogonal signal).

In step S206, the OFDM signal generating unit 26 converts the modulated signal assigned to the radio resource into an OFDM signal, and then transmits the OFDM signal.

However, there has been a problem of deterioration in transmission efficiency by using the above-mentioned conventional transmission apparatus 20. This is because, a bit sequence is not assigned to a part of a symbol component in the modulated signal having performed the layer coding processing, when a length of bit sequence differs between a bit sequence of the information source 1 and a bit sequence of the information sources 2.

Here, consider an example case where the length of the bit sequence which constitutes the information source 1 is longer than the bit sequence which constitutes the information source 2, as shown in FIG. 5A. In this example case, any bit sequence constituting the information source 2 is not assigned to a part of a symbol component 2.

Specifically, if the example shown in FIG. 3 is applied to this example case, the layer coding unit 24 performs the layer coding processing in which bit sequence constituting information source 2 is not assigned to the symbol component B2 and a bit sequence constituting the information source 1 is assigned only to the symbol component B1.

The modulated signal having performed the layer coding processing in this case is configured of any one of four patterns of symbols with two bits indicated in one symbol (that is, the modulated signal in this case has two symbol components).

Meanwhile, if the example shown in FIG. 4 is applied to the aforementioned example case, the layer coding unit 24 performs layer coding processing in which a symbol component 2 (Q component) is not assigned any bit sequence constituting the information source 2, and only a symbol component 1 (I component) is assigned a bit sequence constituting the information source 1.

The modulated signal having performed the layer coding processing in this case is configured of any one of two patterns of symbols with one bit indicated in one symbol.

Moreover, there has been a problem of deterioration in transmission efficiency by using the above-mentioned conventional transmission apparatus 20. This is because, the deterioration is caused, a bit sequence is not assigned to a part of the each symbol component in the modulated signal having performed the layer coding processing, when a transmittable data length of each radio resource is longer than a length of a bit sequence constituting the information sources 1 and 2.

For example, there has been a problem of deterioration in transmission efficiency when the transmittable data length of each radio resource is longer than the length of the each bit sequence constituting the information source 1 and 2 as shown in FIG. 5B. This is because, the deterioration is caused, in such a situation, a part of each the symbol component 1 and 2 in the modulated signal having performed the layer coding processing is not assigned the each bit sequence constituting the information source 1 and 2.

BRIEF SUMMARY OF THE INVENTION

Thus, the present invention has been made in view of the above-mentioned problems, and aims to provide a transmission apparatus capable of preventing deterioration in transmission efficiency while making full use of effects of layer coding processing and multiplexing processing (scheduling processing).

A first aspect of the present invention is summarized as a transmission apparatus: a layer multiplexing unit configured to assign, to a radio resource which is divided based on a time, a frequency and a layer, a bit sequence which constitutes at least one information source to be transmitted, in accordance with a communication state and a priority level of the information source; and a layer coding unit configured to perform a layer coding processing for the bit sequence assigned to the radio resource, wherein the layer multiplexing unit is configured to perform the assignment so that a length of each bit sequence assigned to each radio resource becomes equivalent.

According to the present invention, the problem of deterioration in transmission efficiency can be solved. This is because, the deterioration is caused, a bit sequence is not assigned to a part of a symbol component in the modulated signal having performed the layer coding processing, when a length of each bit sequence differs between information sources having different priority levels. This problem can be solved since the layer coding unit is configured to perform layer coding processing for each bit sequence of the equal length, assigned to the radio resources.

In the first aspect of the present invention, the layer multiplexing unit may assign, to the each radio resource, the each bit sequence with a length corresponding to a transmittable data length in the each radio resource.

According to the present invention, the problem of deterioration in transmission efficiency can be solved. This is because, the deterioration is caused, a bit sequence constituting the information source is not assigned to a part of a symbol component in the modulated signal having performed the layer coding processing, when the transmittable data length of each radio resource is longer than a length of a bit sequence constituting each of the information sources. This problem can be solved since the layer multiplexing unit is configured to assign, to the radio resource, each bit sequence with a length corresponding to a transmittable data length of the each radio resource.

A second aspect of the present invention is summarized as a transmission method including: assigning, to a radio resource which is divided based on a time, a frequency and a layer, a bit sequence which constitutes at least one information source to be transmitted, in accordance with a communication state and a priority level of the information source; and performing a layer coding processing for the bit sequence assigned to the radio resource, wherein in the step of assigning, so that a length of each bit sequence assigned to each radio resource becomes equivalent.

BRIEF DESCRIPTION OF THE DRAWINGS

FIG. 2 is a flowchart illustrating operations of the conventional transmission apparatus.

FIG. 3 is a diagram for explaining layer coding processing of a layer coding unit in a conventional transmission apparatus.

FIG. 4 is a diagram for explaining layer coding processing of a layer coding unit in a conventional transmission apparatus.

FIG. 5A is a diagram for explaining a problem in the conventional transmission apparatus.

FIG. 5B is a diagram for explaining a problem in the conventional transmission apparatus.

FIG. 6 is a functional block diagram showing a transmission apparatus according to a first embodiment of the present invention.

DETAILED DESCRIPTION OF THE INVENTION (Configuration of Transmission Apparatus According to First Embodiment of Present Invention)

An explanation will be given for the configuration of a transmission apparatus 10 according to a first embodiment of the present invention with reference to FIGS. 6 to 8.

Figure 1:
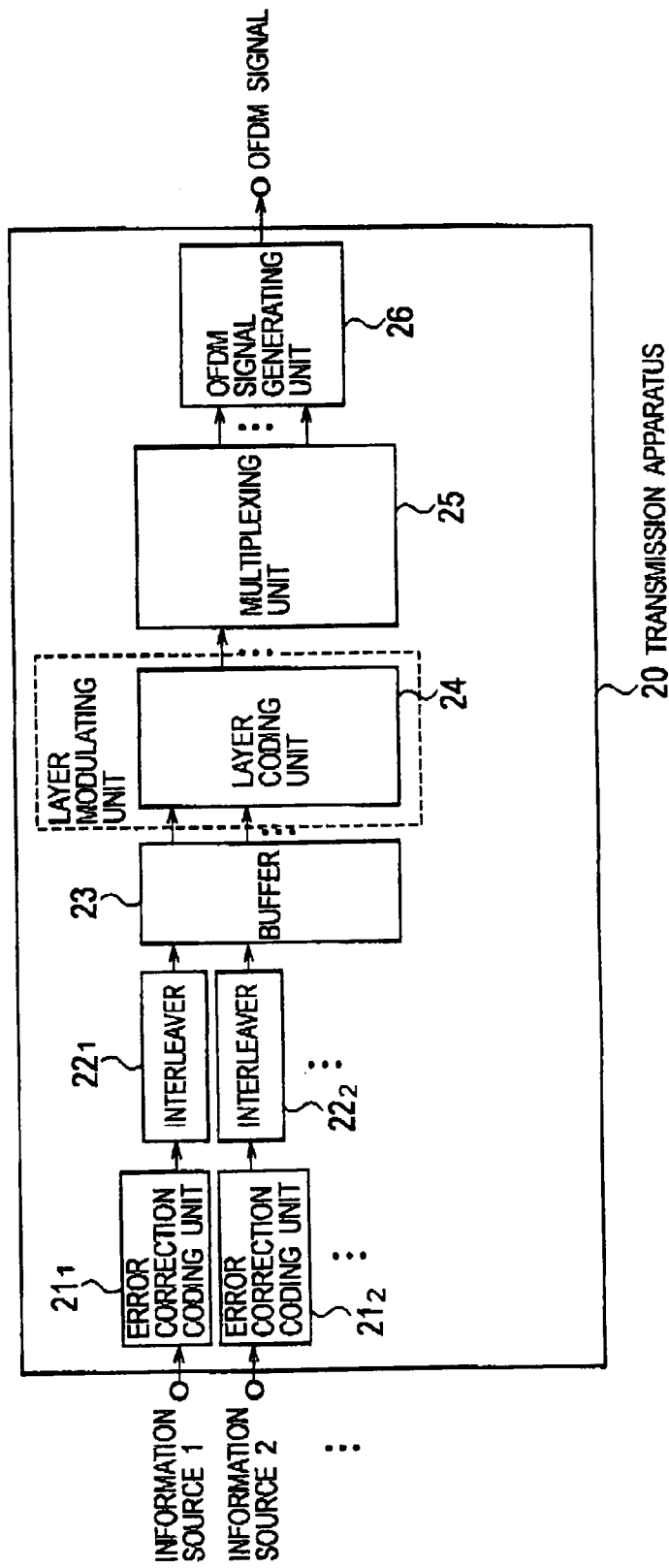
FIG. 1 is a functional block diagram showing a conventional transmission apparatus.

The transmission apparatus 10 according to the first embodiment of the present invention is configured, as similar to the transmission apparatus 20 shown in FIG. 1 above, by applying the layer coding method to the OFDM method that is one of multi-carrier transmission methods.

As shown in FIG. 6, the transmission apparatus 10 includes a plurality of error correction coding units $11_1$, $11_2$, ..., a plurality of interleavers $12_1$, $12_2$, ..., a buffer 13, a layer multiplexing unit 14, a layer coding unit 15, and an OFDM signal generating unit 16.

The error correction coding units $11_1$, $11_2$, ... are configured to perform error correction coding processing for each bit sequence constituting a corresponding one of the inputted information sources 1, 2, ....

The interleavers $12_1$, $12_2$, ... are configured to perform interleave processing for each bit sequence outputted from the error correction coding units $11_1$, $11_2$, ... after error correction processing.

The buffer 13 is configured to store the bit sequences outputted from the interleavers $12_1$, $12_2$, ... after the interleave processing.

The layer multiplexing unit 14 is configured to assign, to a radio resource, a bit sequence which constitutes at least one information source 1, 2, ... to be transmitted, in accordance with a communication state and a priority level of the information sources. Here, the radio resources are divided based on a time, a frequency (orthogonal frequency and sub-carrier) and a layer.

In other words, the layer multiplexing unit 14 is configured to perform multiplexing processing (scheduling processing) for bit sequences extracted from the buffer 13.

Figure 7:
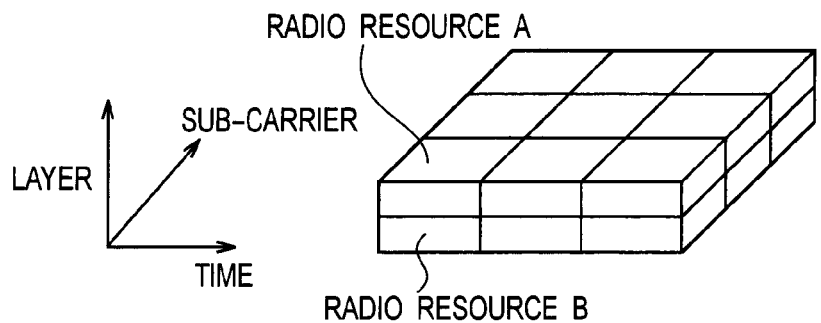
FIG. 7 is a diagram for explaining multiplexing processing of a layer multiplexing unit of the transmission apparatus according to the first embodiment of the present invention.

For example, as shown in FIG. 7, the layer multiplexing unit 14 performs the multiplexing processing (scheduling processing) for the bit sequences extracted from the buffer 13 after determining the following. Specifically, the layer multiplexing unit 14 determines, in accordance with the priority level of the information source corresponding to each of the extracted bit sequences, whether to assign the extracted bit sequence to a radio resource B belonging to a high-priority layer, or to a radio resource A belonging to a low-priority layer.

In addition, the layer multiplexing unit 14 is configured to perform assignment so that a length of each bit sequence assigned to the each radio resource A and B becomes equivalent to one another.

For example, the layer multiplexing unit 14 assigns a bit sequence constituting the information source 1 to the radio resource A, and assigns a bit sequence constituting the information source 2 and a bit sequence constituting the information source 3 to the radio resource B. In this way, the layer multiplexing unit 14 performs multiplexing processing (scheduling processing) by assigning so that a length of each bit sequence assigned to the each radio resource A and B becomes equivalent (see FIG. 8A).

Additionally, the layer multiplexing unit 14 may be configured to assign, to the radio resources A and B, each bit sequence with a length corresponding to a transmittable data length in the each radio resources A and B, respectively.

For example, the layer multiplexing unit 14 may perform multiplexing processing (scheduling processing) by assigning a bit sequence constituting the information source 1 and a bit sequence constituting the information source 4 to the radio resource A, and assigning a bit sequence constituting the information source 2 and a bit sequence constituting the information source 5 to the radio resource B. Hence, the radio resources A and B are assigned each bit sequence with length corresponding to the each transmittable data length of the each radio resources A and B, respectively (see FIG. 8B).

The layer coding unit 15 is configured to perform a layer coding processing for the bit sequence assigned to each of the radio resources A and B outputted from the layer multiplexing unit 14.

For example, the layer coding unit 15 is configured to perform the layer coding processing by the above-mentioned methods shown in FIGS. 3 and 4.

Figure 8A:
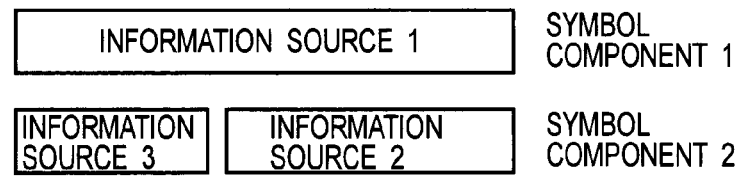
FIG. 8A is a diagram for explaining layer coding processing of a layer coding unit of the transmission apparatus according to the first embodiment of the present invention.

Here, according to the transmission apparatus 10 of the present invention, multiplexing processing (scheduling processing) can be performed so that bit sequences with the equal length are assigned to the radio resources A and B, even when a length of a bit sequence constituting the information source 1 is longer than a length of a bit sequence constituting the information source 2. This is because, as mentioned above, the layer multiplexing unit 14 assigns a bit sequence constituting the information source 1 to the radio resource A, and assigns a bit sequence constituting the information source 2 and a bit sequence constituting the information source 3 to the radio resource B. Hence, as shown in FIG. 8A, the transmission apparatus 10 can prevent from occurring the state where a bit sequence is not assigned to the symbol component 2 in the modulated signal having performed the layer coding processing.

Figure 8B:
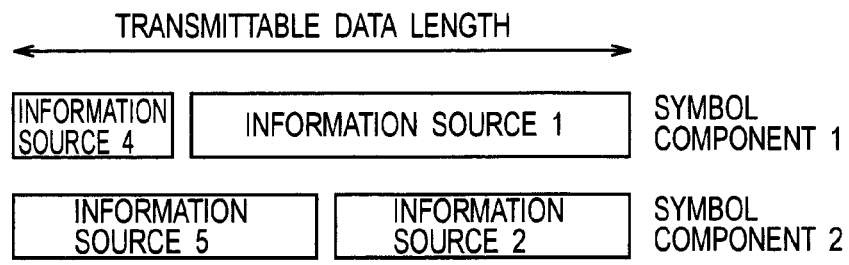
FIG. 8B is a diagram for explaining layer coding processing of a layer coding unit of the transmission apparatus according to the first embodiment of the present invention.

Moreover, according to the transmission apparatus 10 of the present invention, multiplexing processing (scheduling processing) can be performed the assignment, to each of the radio resources A and B, each bit sequence with a length corresponding to the transmittable data length of each of the radio resources A and B, even when the transmittable data length of each of the radio resources A and B is longer than a bit sequence constituting the information source 1 and a bit sequence constituting the information source 2. This is because, as mentioned above, the layer multiplexing unit 14 assigns a bit sequence constituting the information source 1 and a bit sequence constituting the information sources 4 to the radio resource A, and assigns a bit sequence constituting the information source 2 and a bit sequence constituting the information source 5 to the radio resource B. Hence, as shown in FIG. 8B, the transmission apparatus 10 can prevent from occurring the state where a bit sequence is not assigned to the symbol components 1 and 2 in the modulated signal having performed the layer coding processing.

The OFDM signal generating unit 16 is configured to convert the modulated signal assigned to each of the radio resources A and B into an OFDM signal, and then to transmit the signals.

(Operation of Transmission Apparatus According to First Embodiment of Present Invention)

An explanation will be given for operations of the transmission apparatus 10 according to the first embodiment of the present invention with reference to FIG. 9. Note that descriptions are omitted for operations in steps S101 to S103, since they are the same as those in steps S201 to 203 described in FIG. 2.

Figure 9:
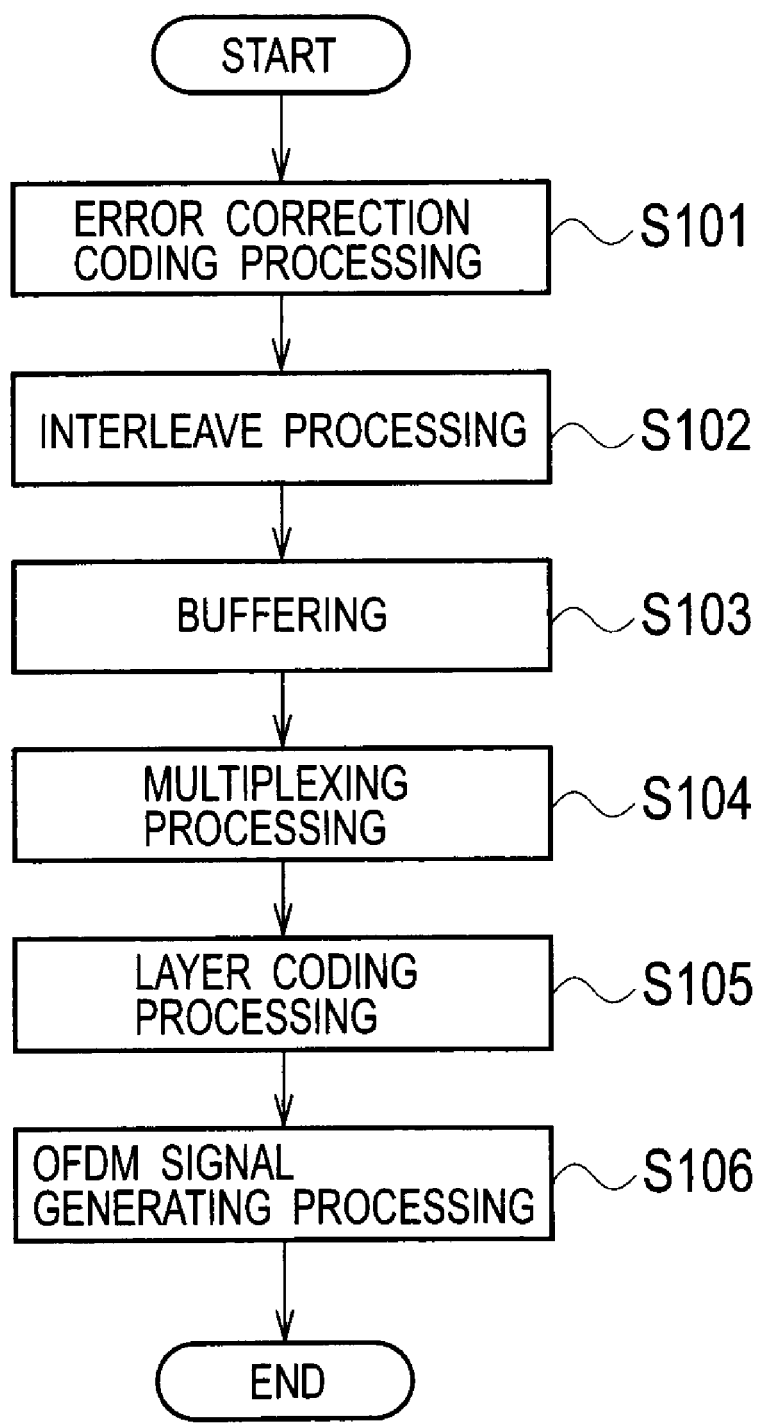
FIG. 9 is a flowchart illustrating operations of the transmission apparatus according to the first embodiment of the present invention.

As shown in FIG. 9, in step S104, the layer multiplexing unit 14 assigns, to the radio resources, a bit sequence constituting at least one information source 1, 2, ... to be transmitted, in accordance with a communication state and a priority level of information source 1, 2, ..., extracted from the buffer 13. Here, the radio resources are divided by a time, a frequency (orthogonal frequency and sub-carrier), and a layer.

In step S105, the layer coding unit 15 performs layer coding processing for each bit sequence assigned to each of the radio resources A and B, outputted from the layer multiplexing unit 14.

In step s106, the OFDM signal generating unit 16 converts the modulated signal assigned to each radio resource into an OFDM signal, and then transmits the OFDM signals.

(Effects and Advantages of Transmission Apparatus According to First Embodiment of Present Invention)

By use of the transmission apparatus 10 according to the first embodiment of the present invention, the problem of deterioration in transmission efficiency can be solved. This is because, the deterioration is caused, a bit sequence is not assigned to a part of the symbol component B2 in the modulated signal having performed the layer coding processing, when the lengths of bit sequences differ between information sources 1 and 2 having different priority levels (that is, when a length of a bit sequence constituting the information source 1 is longer than a length of a bit sequence constituting the information source 2). This problem can be solved since the layer coding unit 15 of the transmission apparatus 10 is configured to perform layer coding processing for bit sequences of the equal length, assigned to the radio resources A and B.

By use of the transmission apparatus 10 according to the first embodiment of the present invention, the problem of deterioration in transmission efficiency can be solved. This is because, the deterioration is caused, bit sequences constituting the information sources 1 and 2 are not assigned to a part of each of symbol components B1 and B2 in the modulated signal having performed the layer coding processing, when the transmittable data length of the radio resources A and B is longer than the lengths of bit sequences constituting the information sources 1 and 2. This problem can be solved since the layer multiplexing unit 14 of the transmission apparatus 10 is configured to assign, to each radio resource A and B, each bit sequence with a length corresponding to the transmittable data length of each of the radio resources A and B.

What is claimed is:

1. A transmission apparatus comprising:
    a signal generator that transmits a transmission symbol including a first symbol component and a second symbol component having a higher reception quality at a reception apparatus than that of the first symbol component, using at least a first radio resource and a second radio resource, each radio resource being configured to perform transmission at a specified combination of a frequency and a time, wherein the signal generator transmits the transmission symbol over both of the first radio resource and the second radio resource by transmitting the first symbol component using the first radio resource and by transmitting the second symbol component by using the second radio resource;
    a layer multiplexer configured to assign a first bit sequence that includes information from at least a first information source to the first symbol component and a second bit sequence that includes at least information from a second information source having a higher priority level than that of the first bit sequence to the second symbol component, respectively, and assign, respectively, the first radio resource to the first bit sequence and a second radio resource to the second bit sequence in accordance with a state of a communication with the reception apparatus, the layer multiplexer further being configured to receive information from a third information source, wherein each of the information from the first information source, the second information source, and the third information source is information to be transmitted to a reception apparatus via radio transmission; and
    a layer coder configured to perform a layer coding processing for generating the transmission symbol in accordance with assignment by an assign unit, wherein
    the layer multiplexer is configured to assign, the first bit sequence with a length corresponding to an amount of transmittable data available in the first radio resource, to the first symbol component, and assign the second bit sequence with a length corresponding to an amount of transmittable data available in the second radio resource, to the second symbol component, and when a respective one of the first bit sequence and the second bit sequence does not have a length corresponding to the amount of transmittable data available in the first radio resource or the second radio resource respectively, the layer multiplexer adds the information from the third information source to the respective one of the first bit sequence and the second bit sequence.

2. The transmission apparatus according to claim 1, wherein the length of the first bit sequence and the length of the second bit sequence are equivalent to each other.

3. A transmission method, implemented on a transmission apparatus, comprising:
    transmitting, from a signal generator, a transmission symbol including a first symbol component and a second symbol component having a higher reception quality at a reception apparatus than that of the first symbol component, using at least a first radio resource and a second radio resource, each radio resource being configured to perform transmission at a specified combination of a frequency and a time, wherein the transmitting includes transmitting the transmission symbol over both of the first radio resource and the second radio resource by transmitting the first symbol component using the first radio resource and by transmitting the second symbol component by using the second radio resource,
    wherein prior to the transmitting, the method includes
    assigning, at a layer multiplexer, a first bit sequence that includes information from at least a first information source to the first symbol component and a second bit sequence that includes at least information from a second information source having a higher priority level than that of the first bit sequence to the second symbol component, respectively, and assigning, respectively, the first radio resource to the first bit sequence and the second radio resource to the second bit sequence in accordance with a state of a communication with the reception apparatus, wherein the layer multiplexer further receives information from a third information source, wherein each of the information from the first information source, the second information source, and the third information source is information to be transmitted to a reception apparatus via radio transmission; and
    performing, at a layer coder, a layer coding processing for generating the transmission symbol in accordance with assignment by an assign unit, wherein
    the assigning further includes assigning the first bit sequence with a length corresponding to an amount of transmittable data available in the first radio resource, to the first symbol component, and assigning the second bit sequence with a length corresponding to an amount of transmittable data available in the second radio resource, to the second symbol component, and when a respective one of the first bit sequence and the second bit sequence does not have a length corresponding to the amount of transmittable data available in the first radio resource or the second radio resource respectively, the assigning step includes adding the information from the third information source to the respective one of the first bit sequence and the second bit sequence.

4. The transmission method according to claim 3, wherein the length of the first bit sequence and the length of the second bit sequence are equivalent to each other.

* * * * *